J. ESCHERICH.
SPRING CONTROLLED VEHICLE WHEEL.
APPLICATION FILED JULY 16, 1914.
1,149,432.
Patented Aug. 10, 1915.
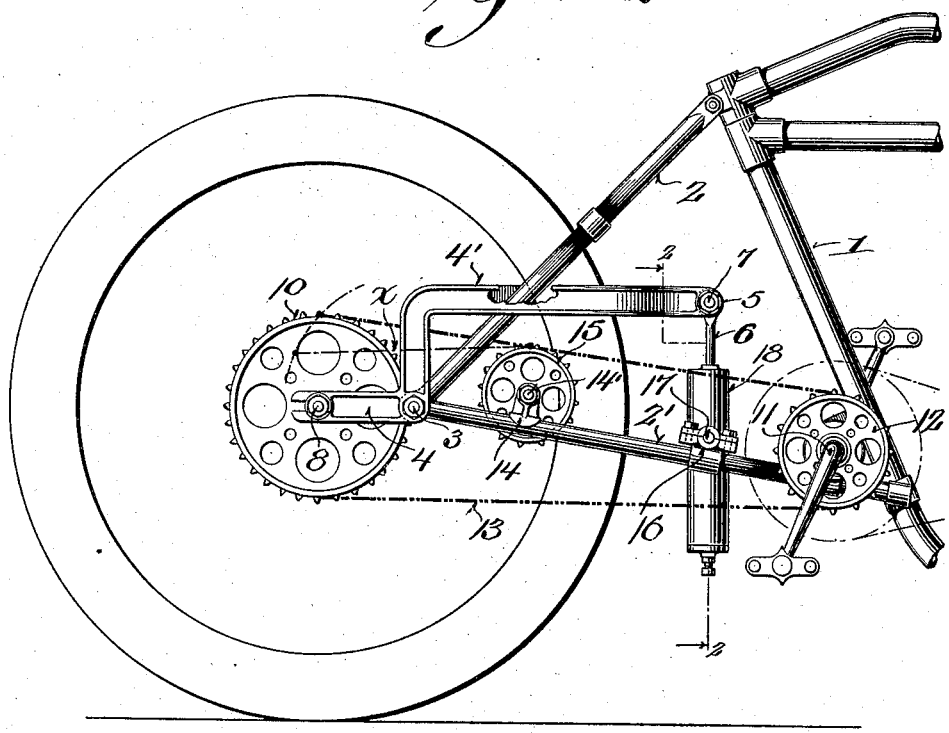
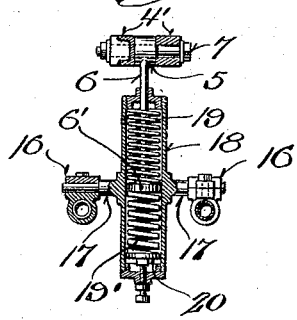

UNITED STATES PATENT OFFICE.

JOHN ESCHERICH, OF HARTFORD, WISCONSIN.

SPRING-CONTROLLED VEHICLE-WHEEL.

1,149,432. Specification of Letters Patent. Patented Aug. 10, 1915.

Application filed July 16, 1914. Serial No. 851,271.

*To all whom it may concern:*

Be it known that I, JOHN ESCHERICH, a subject of the Emperor of Germany, but having filed my intention to become a citizen of the United States, and resident of Hartford, in the county of Washington and State of Wisconsin, have invented certain new and useful Improvements in Spring-Controlled Vehicle-Wheels; and I do hereby declare that the following is a full, clear, and exact description thereof.

My invention has for its primary object to provide a simple, economical and effective spring-controlled traction wheel attachment for the rear fork constituting part of the frame of a motorcycle or like vehicle.

Specific objects are to provide a pair of connected oscillatory levers, the short arms of which carry a floating axle for a traction wheel; to provide a spring-controlled dash-pot in oscillatory union with the lower members of the fork portion of the vehicle frame, the said dash-pot being connected to the long arms of said levers; to provide a drive and driven gear-wheel in belt connection with the traction wheel and a slack take up wheel for the belt affixed to the frame member whereby variations in the length of the belt coincident to rise and fall of the floating traction wheel are compensated for.

With the above and other objects in view the invention consists in certain peculiarities of construction and combination of parts as hereinafter set forth with reference to the accompanying drawings and subsequently claimed.

In the drawings Figure 1 illustrates an elevation of the rear portion of a motorcycle frame embodying the features of my invention, and Fig. 2, a cross-section of the same, the section being indicated by line 2—2 of Fig. 1.

Referring by characters to the drawings, 1 represents the seat-mast of a motorcycle frame or like vehicle to which is attached rearwardly converging upper and lower frame members 2, 2', respectively, said members being arranged in companion pairs to constitute a rear fork having pivot studs 3 extending transversely from their points of intersection. Mounted upon the alined pivot studs 3 are companion levers having rearwardly extended short arms 4 and forwardly extended long arms 4', which arms terminate over the lower frame members 2' and are bowed inwardly adjacent to their ends. The ends of the long arms have interposed therebetween the head 5 of a pitman rod 6, which head and ends of said arms are clamped together by a retaining bolt 7, as best shown in Fig. 2. Thus the long arms are rigidly connected, while the free ends of the short arms are connected by an axle bolt 8, which bolt is adapted to receive the hub of a traction wheel 9 that also carries a gear-wheel 10.

A crank-shaft 11 of the ordinary type is mounted adjacent to the point of intersection between the lower members 2' of the fork and the seat-mast 1, which crank-shaft carries a drive-wheel 12 in the form of a toothed sprocket. The drive gear wheel 12 and traction carried driven gear wheel 10 are connected by a belt 13 in the usual manner.

One of the lower frame members 2' is provided with an upwardly extended ear 14 carrying a stud 14', upon which stud is mounted a belt-guiding or tightening wheel 15, the top face of which wheel is adapted to engage the upper stretch of the drive-belt 13 and the point of engagement of this wheel and the chain is, as shown, upon a considerably higher plane than the axis of the traction wheel. Hence when the traction wheel oscillates downwardly, describing an arc of a circle from the fulcrum point of the levers, as indicated by dotted lines, it will be apparent that the high point of the gear-wheel 10 will move away from the high point of the guide-wheel 15, whereby the stretch of chain between said wheels, indicated by line $x$, will be lengthened. Thus this lengthening of the chain between the points mentioned will compensate for slackening of the idle stretch of the chain 13 between the low points of the drive and driven wheels 12, 10, respectively, whereby the variations in the length of belt are automatically compensated for due to shortening and lengthening of said belt coincident to rise and fall of the traction wheel.

The lower fork members 2 and 2' carry clips 16, which clips constitute boxes for trunnions 17 that project transversely from the walls of a dash-pot housing 18, the said housing being vertically disposed. The piston-rod 6 extends into the housing and terminates with a piston head 6', between which and the upper head of the housing there is interposed a comparatively delicate coiled spring 19. Between the lower face of the piston-head 6 and the bottom of the housing there is interposed a comparatively stiff coiled spring 19', the tension of which coiled spring is regulated by an adjustable cap 20 with which the lower end of the dash-pot housing is provided. By this arrangement it will be seen that the upper spring 19 constitutes the load-carrying member of the spring-controlled dash-pot, while the bottom spring 19' serves as a shock-absorber to thus reduce vibration of the frame produced by rise and fall of the traction wheel, whereby an easy riding vehicle is produced, the traction wheel being adapted to compensate for rough road conditions. Attention is also called to the fact that, owing to the spring-controlled dash-pot being oscillatory, the levers are rendered free to move back and forth without imparting strain to any of the mechanical elements, while, at the same time, rigidity of the assemblage is insured.

I claim:

In a vehicle of the described character having rearwardly converging companion upper and lower fork members and alined transversely disposed pivots extending from the intersecting points of each pair of said fork members, companion levers fulcrumed upon the pivots having short arms extending rearwardly and long arms extending forwardly and over the lower fork members, means for rigidly securing the ends of the long arms of the levers together; the combination of alined clips having boxes secured to the lower fork members, a vertically positioned housing having trunnions extending from its side walls intermediate of the ends thereof, the trunnions being mounted in the boxes whereby said housing is adapted to oscillate, a spring-controlled piston-head mounted in the housing, a piston carried thereby, and extending outwardly from the housing, and means for securing the upper ends of the piston to the connected ends of the long arms of said levers.

In testimony that I claim the foregoing I have hereunto set my hand at Hartford, in the county of Washington and State of Wisconsin, in the presence of two witnesses.

JOHN ESCHERICH.

Witnesses:
FRANK PLOUFF,
ANTON ORNET.

Copies of this patent may be obtained for five cents each, by addressing the "Commissioner of Patents, Washington, D. C."